US008108506B2

(12) United States Patent
Ida (10) Patent No.: US 8,108,506 B2
(45) Date of Patent: Jan. 31, 2012

(54) ELECTRONIC DEVICE AND CONNECTED DEVICE SEARCHING METHOD

(75) Inventor: Tomotaka Ida, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 12/561,072

(22) Filed: Sep. 16, 2009

(65) Prior Publication Data

US 2009/0327474 A1 Dec. 31, 2009

Related U.S. Application Data

(63) Continuation of application No. PCT/JP2008/071751, filed on Nov. 21, 2008.

(30) Foreign Application Priority Data

Feb. 26, 2008 (JP) .................................. 2008-044906

(51) Int. Cl.
G06F 15/173 (2006.01)
(52) U.S. Cl. .......................... 709/223; 709/224; 709/245
(58) Field of Classification Search .................. 709/223, 709/224, 245
See application file for complete search history.

(56) References Cited

U.S. PATENT DOCUMENTS

| | | | | |
|---|---|---|---|---|
| 5,987,524 | A * | 11/1999 | Yoshida et al. | 709/245 |
| 7,849,218 | B2 * | 12/2010 | Funabiki et al. | 709/245 |
| 2009/0138779 | A1 * | 5/2009 | Funabiki et al. | 714/749 |

FOREIGN PATENT DOCUMENTS

| | | |
|---|---|---|
| JP | 01-120926 | 5/1989 |
| JP | 01-122233 | 5/1989 |
| JP | 07-177161 | 7/1995 |
| JP | 09-331339 | 12/1997 |
| JP | 2007-202115 | 8/2007 |
| JP | 2008-035190 | * 2/2008 |
| JP | 2008-035192 | * 2/2008 |
| JP | 4116071 | 7/2008 |
| WO | 2007/091706 A1 | 8/2007 |
| WO | 2007/136038 A1 | 11/2007 |
| WO | 2008/013132 A1 | 1/2008 |

OTHER PUBLICATIONS

High-Definition Multimedia Interface Specification Version 1.3a, Hitachi, Ltd./Matushita Electric Industrial Co., Ltd./ Philips Consumer Electronics, International B.V./Silicon Image, Inc./Sony Corporation?Thomson Inc./Toshiba Corporation, Nov. 10, 2006.
PCT Search Report and Written Opinion of the International Searching Authority for application No. PCT/JP2008/071751 dated Jan. 13, 2009 for which this application is a continuation of.

* cited by examiner

*Primary Examiner* — Philip B Tran
(74) *Attorney, Agent, or Firm* — Blakely, Sokoloff, Taylor & Zafman LLP (57) ABSTRACT

According to one embodiment, a method of making it possible to identify the connection of an external device reliably, the method comprises transmitting a command to check the connection of an external device to a logical address to which no physical address has been caused to correspond in an address list, if there has been a response to the command to check the connection, transmitting to the logical address a command to obtain a physical address allocated to an external device to which the logical address has been allocated, and registering a physical address included in a response to the command to obtain the physical address so as to correspond to the logical address to which the command to check the connection has been transmitted in the address list stored in a storage unit.

6 Claims, 9 Drawing Sheets

| Logical address | Device number | Device type |
|---|---|---|
| 0 | TV | TV |
| 1 | Recording Device 1 | Recording Device |
| 2 | Recording Device 2 | Recording Device |
| 3 | Tuner 1 | Tuner |
| 4 | Playback Device 1 | Playback Device |
| 5 | Audio System | Audio System |
| 6 | Tuner 2 | Tuner |
| 7 | Tuner 3 | Tuner |
| 8 | Playback Device 2 | Playback Device |
| 9 | Recording Device 3 | Recording Device |
| 10 | Tuner 4 | Tuner |
| 11 | Playback Device 3 | Playback Device |
| 12 | (Reserved) | (Reserved) |
| 13 | (Reserved) | (Reserved) |
| 14 | (Free Use) | (Free Use) |
| 15 | (Unregistered) | (None) |

FIG. 5

| Logical address | Physical address | Device type | Device name |
|---|---|---|---|
| 0 | 0.0.0.0. | TV | "Toshiba TV" |
| 1 | 2.0.0.0. | Recording Device | "Toshiba HDD" |
| 2 | (None) | (None) | (None) |
| 3 | 1.1.0.0. | Tuner | "Satellite ABC" |
| 4 | 1.2.0.0. | Playback Device | "DVD Player" |
| 5 | 1.0.0.0. | Audio System | "AV Amplifier" |
| 6 | (None) | (None) | (None) |
| 7 | (None) | (None) | (None) |
| 8 | (None) | (None) | (None) |
| 9 | (None) | (None) | (None) |
| 10 | (None) | (None) | (None) |
| 11 | (None) | (None) | (None) |
| 12 | (None) | (None) | (None) |
| 13 | (None) | (None) | (None) |
| 14 | (None) | (None) | (None) |

| List No. | Logical address | Physical address |
|---|---|---|
| 1 | 1 | 2.0.0.0. |
| 2 | 2 | (None) |
| 3 | 3 | 1.1.0.0. |
| 4 | 4 | 1.2.0.0. |
| 5 | 5 | 1.0.0.0. |

F I G. 10

F I G. 11

US 8,108,506 B2

ELECTRONIC DEVICE AND CONNECTED DEVICE SEARCHING METHOD

CROSS REFERENCE TO RELATED APPLICATIONS

This is a Continuation Application of PCT Application No. PCT/JP2008/071751, filed Nov. 21, 2008, which was published under PCT Article 21(2) in English.

This application is based upon and claims the benefit of priority from Japanese Patent Application No. 2008-044906, filed Feb. 26, 2008, the entire contents of which are incorporated herein by reference.

BACKGROUND

1. Field

One embodiment of the invention relates to an electronic device capable of communicating with a CEC device and a connected device searching method.

2. Description of the Related Art

The High-Definition Multimedia Interface (HDMI) standard is being used at the present time in the transmission of a video signal and an audio signal between a TV set and a video recorder.

In the HDMI standard, the Consumer Electronic Control (CEC) standard has been defined as an option (refer to Nonpatent Literature 1). The CEC standard is a serial communication protocol which enables HDMI-connected devices to control one another via one (CEC terminal) of the HDMI terminals.

Nonpatent Literature 1: High-Definition Multimedia Interface Specification Version 1.3a, Hitachi, Ltd./Matushita Electric Industrial Co., Ltd./Philips Consumer Electronics, International B.V./Silicon Image, Inc./Sony Corporation/Thomson Inc./Toshiba Corporation Nov. 10, 2006

BRIEF DESCRIPTION OF THE SEVERAL VIEWS OF THE DRAWINGS

A general architecture that implements the various feature of the invention will now be described with reference to the drawings. The drawings and the associated descriptions are provided to Illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic device which communicates with not less than one external device having a logical address selected from a plurality of logical addresses and a physical address, the electronic device comprises a storage unit configured to store an address list in which the physical address of the external device performing the communication is registered so as to correspond to each of said plurality of logical addresses, and a controller configured to transmit a command to check the connection of an external device to at least a part of the logical addresses and, if there has been a response to the command to check the connection from a logical address to which the physical address has not been caused to correspond in the address list, to transmit to the logical address a command to obtain a physical address allocated to an external device to which the logical address has been allocated, to register a physical address included in a response to the command to obtain the physical address so as to correspond to the logical address to which the command to check the connection has been transmitted in the address list stored in the storage unit and, if there has been no response to the command to check the connection from the logical address to which the physical address has been caused to correspond in the address list, to delete, from the address list, information including the physical address of the external device caused to correspond to the logical address to which the command to check the connection has been transmitted.

First Embodiment

Figure 1:
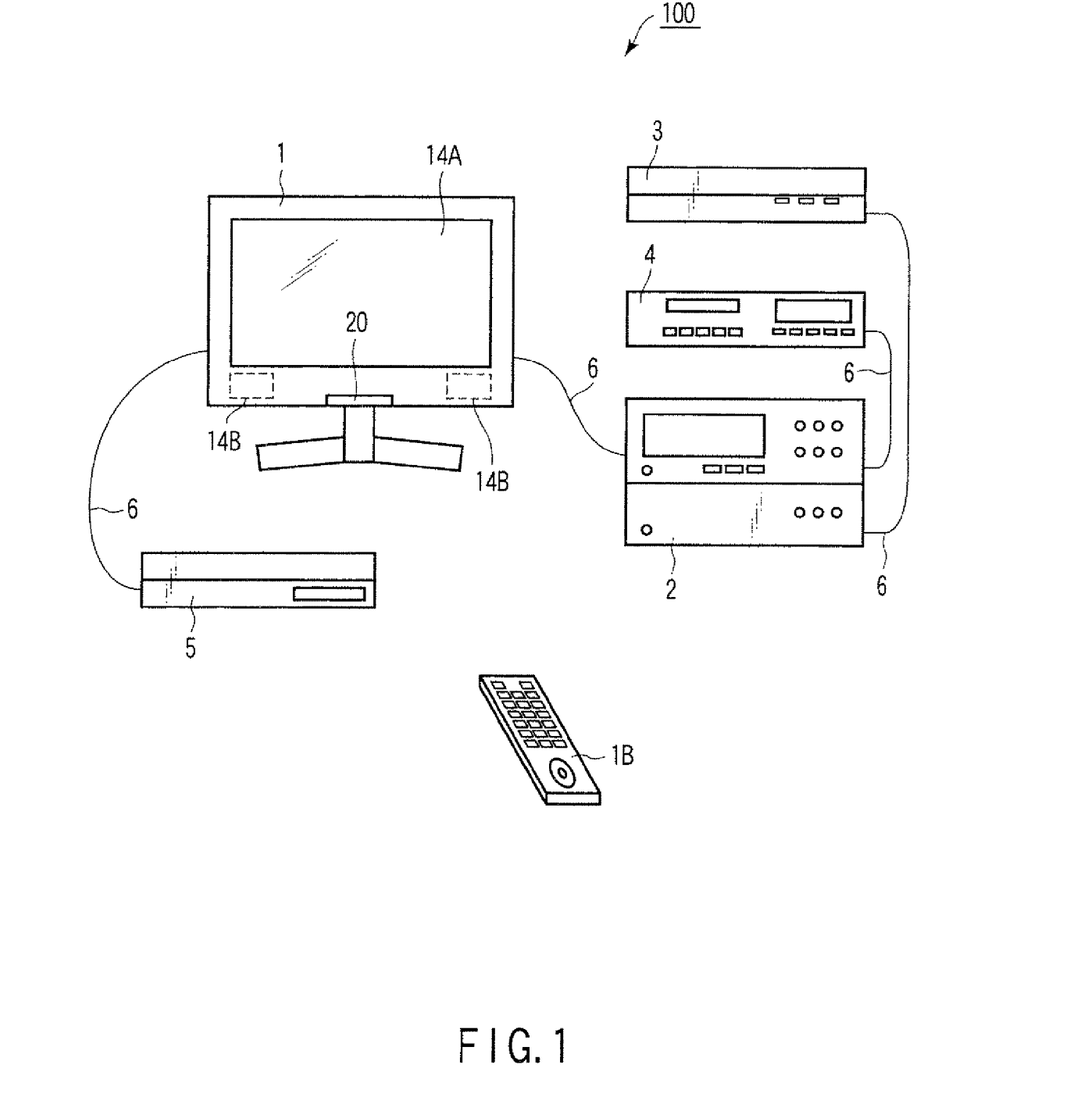
FIG. 1 schematically shows an HDMI system according to a first embodiment of the invention.

FIG. 1 schematically shows a High-Definition Multimedia Interface (HDMI) system according to a first embodiment of the invention.

The HDMI system 100 comprises a TV set 1 which is an electronic device that receives a terrestrial digital broadcast wave from an antenna, demodulates it, and displays the resulting signal, or receives a video signal from an external input and displays the received signal, an audiovisual (AV) amplifier 2 which amplifies and reproduces an audio signal input from a CEC device or switches between the output of an video signal and that of an audio signal input from a CEC device or the like, a set-top box 3 functioning as a tuner which receives and demodulates satellite broadcasts, such as Broadcast Satellite (BS) or Communication Satellite (CS) broadcasts, a DVD player 4 which plays back media, such as a High-Definition Digital Versatile Disc (HD DVD) or DVD, and a hard disc drive (HDD) recorder 5 which can record a video signal from a broadcast and an external input and output the recorded content to the outside. The individual component modules are connected to one another with HDMI cables 6 as shown in FIG. 1, thereby constituting the HDMI system. A remote control 1B is a dedicated remote control for operating the TV set 1. An instruction signal may be transmitted to another electronic device via the HDMI cable 6 to operate the device.

The TV set 1 checks the connection with the individual electronic devices connected via the HDMI cables 6 not only when the power supply of the TV set 1 is turned on but also at regular intervals during a normal operation. Connection check information is transmitted and received using the CEC control lines in the HDMI cables 6.

Figure 2:
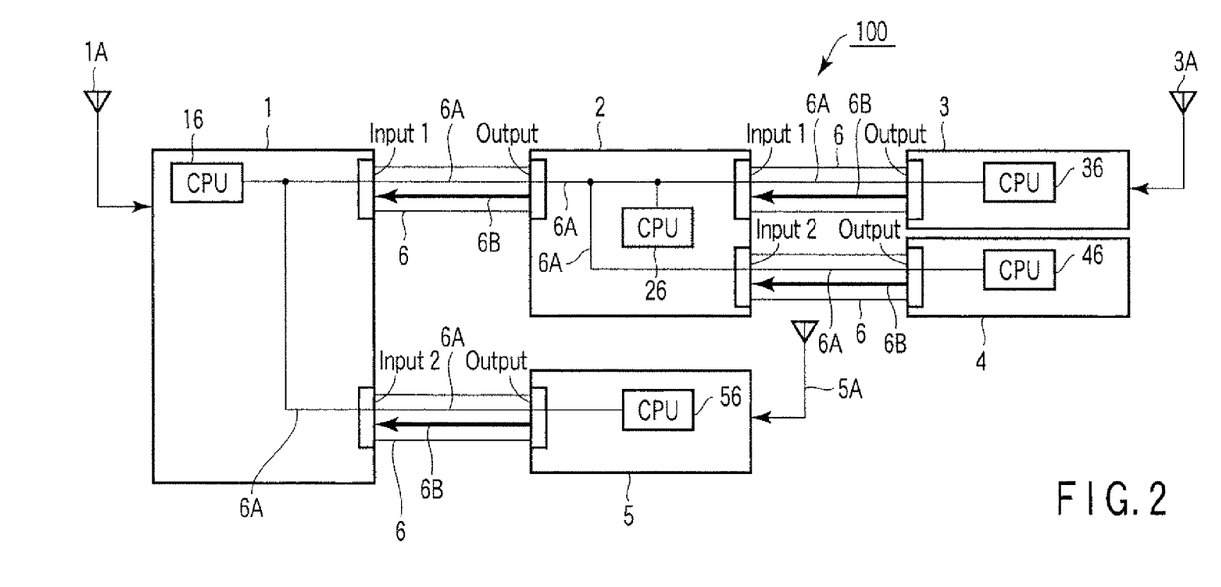
FIG. 2 is a block diagram showing the configuration of the HDMI system according to the first embodiment.

FIG. 2 is a block diagram showing the configuration of the HDMI system according to the first embodiment.

As shown in FIG. 2, the TV set 1 has HDMI terminal input 1 and input 2. The output of the AV amplifier 2 is connected to input 1 of the TV set 1 via an HDMI cable 6. The output of the HDD recorder 5 is connected to input 2 of the TV set 1 via an HDMI cable 6. The TV set 1 receives terrestrial digital broadcast waves via an antenna 1A.

The AV amplifier 2 has HDMI terminal input 1 and input 2. The output of the set-top box 3 is connected to input 1 of the AV amplifier 2 via an HDMI cable 6. The output of the DVD player 4 is connected to input 2 of the AV amplifier 2 via an HDMI cable 6. The set-top box 3 receives BS and CS broadcast waves via an antenna 3A.

The HDD recorder 5 receives terrestrial digital broadcast waves via an antenna 5A.

Each of the HDMI cables 6 has a Consumer Electronics Control (CEC) control line 6A and an HDMI line 6B. The CEC control lines 6A are connected serially between the CPUs 16, 26, 36, 46 of the individual electronic devices. The HDMI lines 6B are connected between the individual electronic devices so as to transmit video signals and audio signals.

Figure 3:
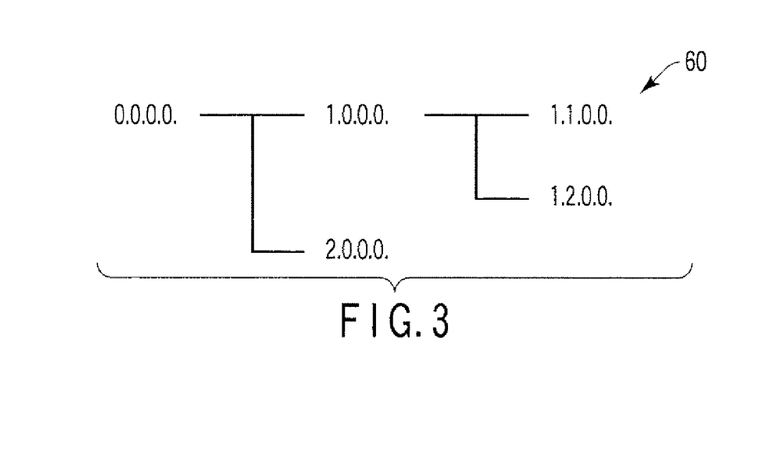
FIG. 3 shows an example of the representation of physical addresses indicating physical addresses set in the individual electronic devices when they are connected as shown in FIG. 2.

FIG. 3 shows a representation example 60 of physical addresses indicating physical addresses set in the individual electronic devices when they are connected as shown in FIG. 2. The TV set 1 is described as "0. 0. 0. 0." The AV amplifier 2 is described as "1. 0. 0. 0." The set-top box 3 is described as "1. 1. 0. 0." The DVD player 4 is described as "1. 2. 0. 0." The HDD recorder 5 is described as "2. 0. 0. 0." Physical addresses are written in such a manner that the TV set 1 is written as a number in a 0th layer and the numbers of inputs to the electronic devices connected to the TV set 1 are written as numbers in a first layer. The same holds true for a second layer, a third layer, and a fourth layer. Accordingly, it is possible to configure a five-layer HDMI system 100, beginning with the TV set 1.

Figure 4:
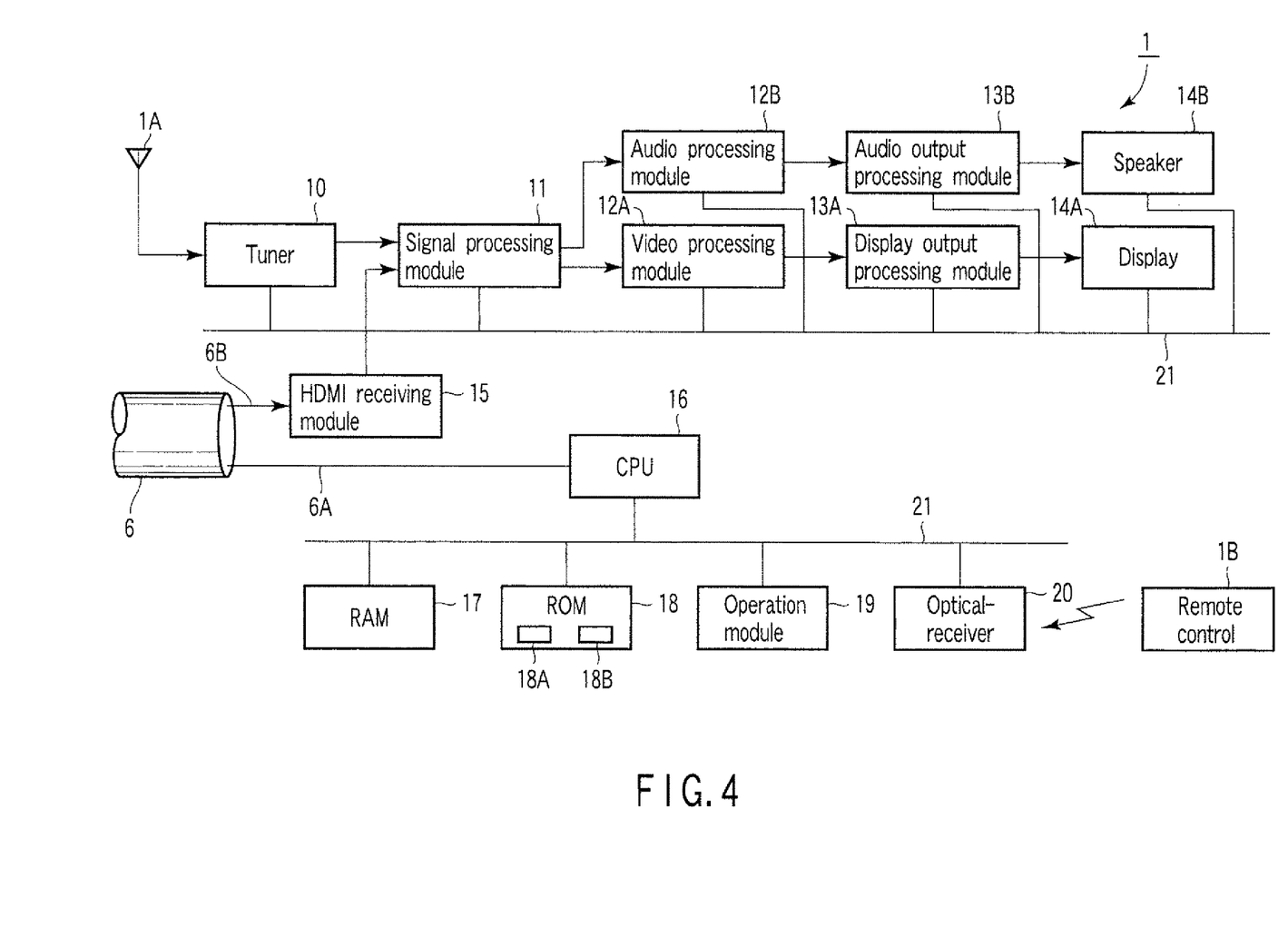
FIG. 4 is a block diagram showing the configuration of a TV set according to the first embodiment.

FIG. 4 is a block diagram showing the configuration of the TV set according to the first embodiment. The TV set 1 includes a tuner 10 which receives terrestrial digital TV broadcast waves (broadcast signals) via the antenna 1A, demodulates a broadcast wave, and outputs a program signal, a signal processing module 11 which sorts the outputs of the tuner 10 into video data, audio data, subtitle data, and others and processes them, a video processing module 12A which decodes the video data and subtitle data output from the signal processing module 11, a display output processing module 13A which converts the output of the video processing module 12A into a video signal for display and outputs the video signal, a display unit 14A which displays the output of the display output processing module 13A on an liquid crystal display (LCD), an audio processing module 12B which decodes the audio data output from the signal processing module 11, an audio output processing module 13B which converts the output of the audio processing module 12B into an audio signal and outputs the audio signal, a speaker 14B which converts the output of the audio output processing module 13B into sound, an HDMI receiving module 15 which receives video data and audio data from the outside via the HDMI line 6B of the HDMI cable 6, a central processing unit (CPU) 16 which transmits and receives CEC control data from the outside via the CEC control line 6A of the HDMI cable 6 and controls each section of the TV set 1, a random access memory (RAM) 17 which temporarily stores data to be processed by the CPU 16, a logical address allocation table 18A, an address list 18B, a RON (Read Only Memory) 18 which records such data as firmware in a nonvolatile manner, an operation module 19 which is composed of a plurality of switches and others and operates the TV set 1 on the basis of the input from the switches, and a light-receiving module 20 which receives an instruction transmitted from the remote control 1B using an infrared signal. The individual modules are connected to one another with a bus 21.

The HDMI cable 6 is connected to each of the HDMI receiving module 15 and CPU 16 via an HDMI interface connected to an HDMI connector (not shown).

Figure 5:
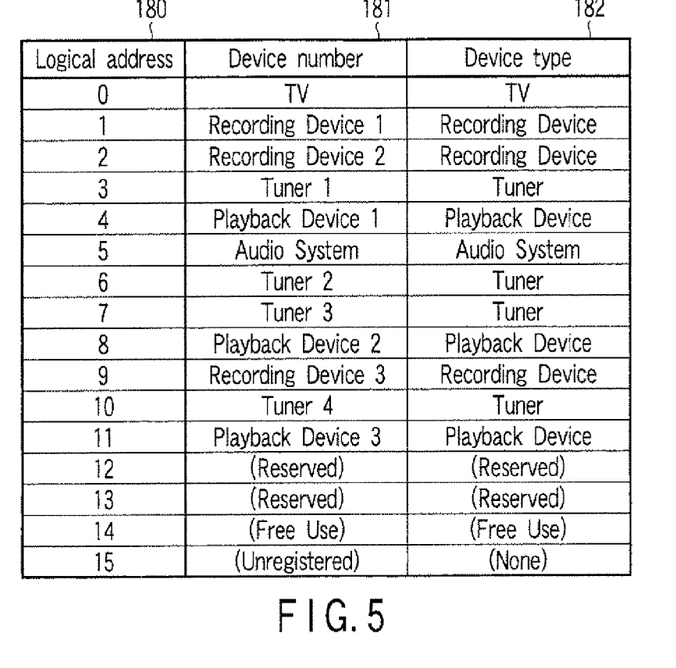
FIG. 5 is a table showing the configuration of a logical address allocation table according to the first embodiment.

FIG. 5 is a table showing the configuration of a logical address allocation table according to the first embodiment.

As shown in FIG. 5, the logical address allocation table 18A is a table which causes logical addresses 180 conforming to the HDMI-CEC standard to correspond to device numbers 181 and device t types 182. Sixteen logical addresses 180 are prepared, ranging from "0" to "15."

Although the device numbers 181 and the device types 182 have been set to "0" to "11" in the logical addresses 180 as described in the logical address allocation table 18A, neither the device numbers 181 nor the device types 182 are set to "12" and "13" in the logical addresses 180 in "High-Definition Multimedia Interface Specification Version 1.3a" and therefore these logical addresses 180 cannot be used.

An arbitrary device number 181 and an arbitrary device type 182 can be set to "14" in the logical addresses 180 for "Free Use." For example, when recording device 1 to recording device 3 are in use and another recording device should be added, "14" can be used. Although "15" in the logical addresses 180 cannot be used for the device alone, if an instruction is executed, the instruction is transmitted to all the devices excluding the ones using the other logical addresses.

Figure 6:
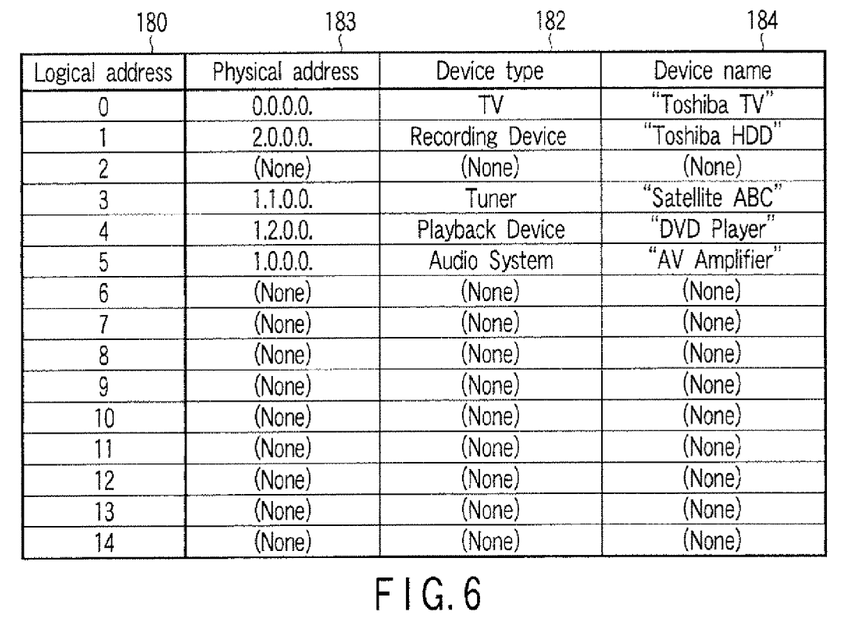
FIG. 6 is a table showing the configuration of an address list according to the first embodiment.

FIG. 6 is a table showing the configuration of an address list according to the first embodiment.

As shown in FIG. 6, when the TV set 1 has confirmed the connection of a CEC device connected via the HDMI cable 6, the physical address 183 and device name 184 of the CEC device are written, thereby making the address list. Here, in the HDMI system 100 shown in FIGS. 2 and 3, a description is given of a case where the TV set 1 has verified that the AV amplifier 2, set-top box 3, DVD player 4, and HDD decoder are connected.

Hereinafter, the operation of the TV set of the first embodiment will be explained with reference to the accompanying drawings.

First, after the power supply of the TV set 1 is turned on by operating the operation module 19 or the remote control 1B, the CPU 16 carries out a startup process of the TV set 1. The startup process is composed of the initialization of various modules, the reading of setting data, and others. The CPU 16 not only performs the startup process but also confirms the connection of the CEC device connected via the HDMI cable. The CPU verifies the connection on the basis of the logical address allocation table 18A by writing the physical addresses 183 and device names 184 of the CEC devices connected to the corresponding ones of the logical addresses 180.

When confirming the connection for each of the logical addresses 180, the CPU 16 performs polling on the connected CEC devices using the command "<Give Physical Address>" determined in the HDMI standard 1.3a. To improve the certainty of the connection, polling is performed repeatedly, for example, five times. If a CEC device has been connected to the logical address 180 on which polling has been done, the CEC device transmits the physical address 183 and device name 184 to the TV set 1 in response to the polling. Here, "0"

in the logical addresses 180 indicates the TV set 1 itself and therefore the TV set registers itself in "0" in the logical addresses 180.

After finishing all the startup process including the verification of the connection, the TV set 1 starts a normal operation. Performing polling on each logical address five times requires a time of about 2 to 3 seconds to confirm all of the connections at the time of startup.

After the TV set 1 has performed the startup process, the newly connected HDMI device is supposed to automatically inform the TV set 1 of physical address information and others using a <Report Physical Address> command. However, some of the HDMI devices do not transmit a <Report Physical Address> command automatically. The TV set 1 cannot recognize such devices.

To overcome this problem, the TV set 1 carries out the process of recognizing a newly connected HDMI device. Hereinafter, a detailed explanation will be given about the process of verifying the connection of an HDMI device carried out after the TV set 1 executes the startup process.

Figure 7:
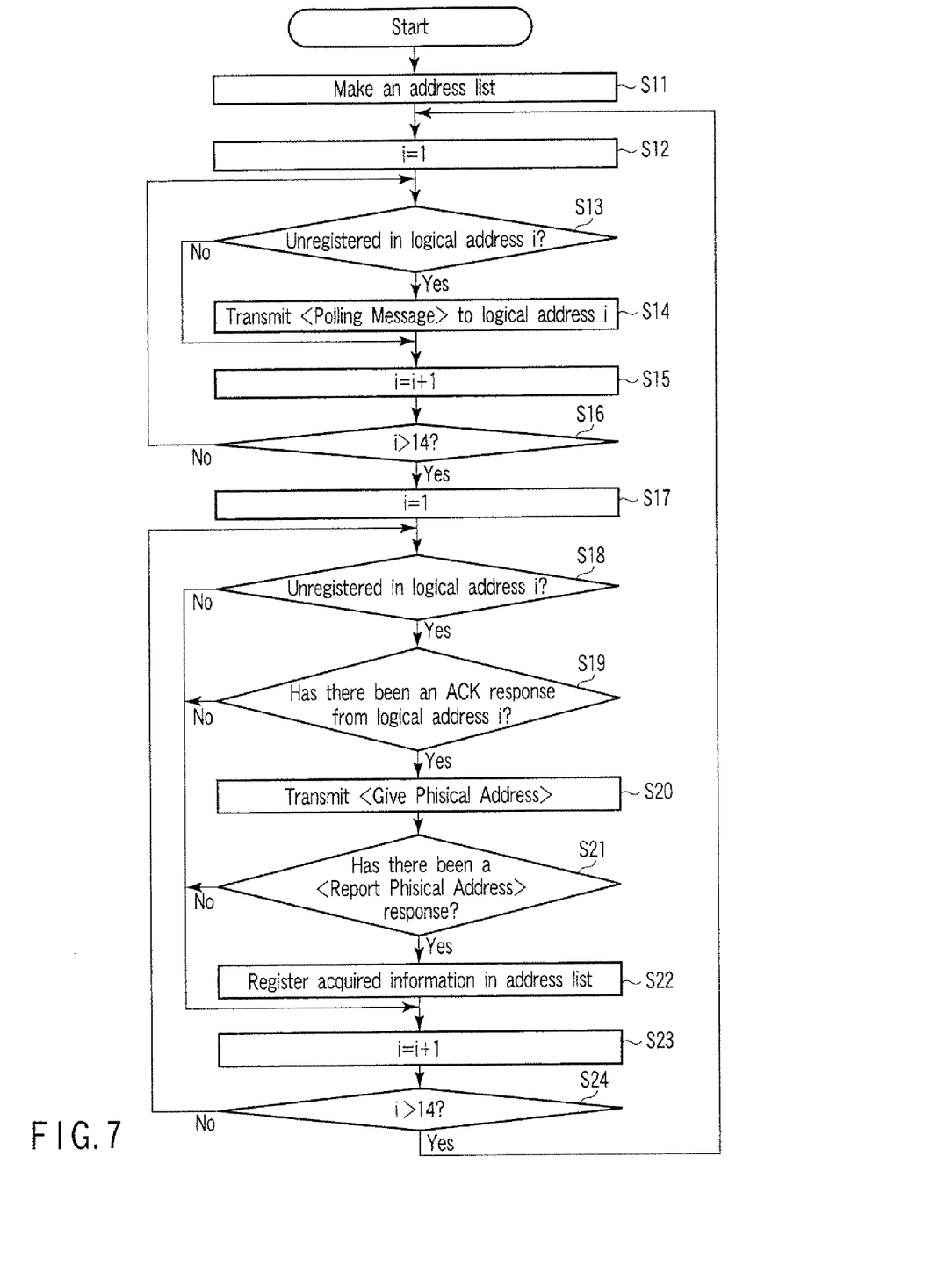
FIG. 7 is a flowchart to help explain the operation of the TV set according to the first embodiment.

FIG. 7 is a flowchart to help explain the operation of the TV set according to the first embodiment. FIG. 7 is a flowchart to help explain a method of monitoring the connected state of a device provided with an HDMI-CEC function (hereinafter, referred to as a CEC device) on the basis of the example of the connection of the system of the TV unit and its peripheral devices explained above. For example, first, the power supply of the TV unit is turned on, which enables communication using the CEC control line.

According to the HDMI-CEC standard, a logical address has been allocated to the connected device as shown in FIG. 5 and the TV unit has already obtained address number 0. Address number 15 is for unspecified numbers which prevent a CEC device from communicating actively.

In this state, suppose the connected devices with address 1 to address 14 have been searched for and an address list has been already made (step 311). By the processes in steps S12 to S16, the CPU 16 transmits a <Polling Message> command determined in the HDMI standard 1.3a to an unregistered logical address. The <Polling Message> command is a command to confirm the presence or absence of a CEC device for a logical address. The <Polling Message> command corresponds to Ping in other protocols. A CEC device which has received a <Polling Message> has to return an <ACK> command to the device which has transmitted the <Polling Message> command.

For example, when a management data table shown in FIG. 6 has been already made, since logical addresses 2, 6, 7, 8, 9, 10, 11, 12, 14 are unregistered addresses, a <Polling Message> command is transmitted to these logical addresses. Hereinafter, the processes in steps S12 to S16 will be explained.

The CPU 16 substitutes 1 into i (step S12). Here, i is a number representing the number of a logical address. Referring to the address list, the CPU 16 determines whether CEC device information is unregistered in logical address i (step S13). If having determined that the information is unregistered (YES in step S13), the CPU 16 transmits a <Polling Message> command to logical address i (step S14).

If it has been determined in step S13 that the information is not unregistered (NO in step S13), or after the process in step S14, the CPU 16 increments the value of i by 1 (step S15). The CPU determines whether the value of i is greater than 14 (step S16). If having determined that the value is not greater than 14 (NO in step S16), the CPU 16 carries out the processes in step S13 onward sequentially since there is a possibility that the address list has a logical address in which a CEC device has not been registered. If having determined that the value is greater than 14 (YES in step S16), the CPU 16 carries out the processes in step S17 onward since the address list has no logical address in which no CEC device has been registered.

In the processes in step S17 onward, the CPU 16 determines whether or not there is an <ACK> command response from the logical address to which the <Polling Message> command has been transmitted, acquires information including a physical address from the CEC device that made the response, and registers the information in the address list. Hereinafter, the processes in step S17 onward will be explained.

First, the CPU 16 substitutes 1 into i (step S71). Here, i is a number representing the number of a logical address. Referring to the address list, the CPU 16 determines whether or not CEC device information (including a physical address) is unregistered in logical address i (step S18). If having determined that CEC device information is unregistered (YES in step S18), the CPU 16 determines whether or not there has been an <ACK> command response from logical address (step S19). If having determined that there has been a response (YES in step S19), the CPU 16 transmits a <Give Physical Address> command to the logical address that transmitted the <ACK> command (step S20) since there is a possibility that a CEC device has been newly connected. The <Give Physical Address> command is a command to inquire for physical address information.

If the connected CEC device is normal, the CEC device transmits the physical address information and others using a <Report Physical Address> command in response to the <Give Physical Address> command. The CPU 16 determines whether or not it has received a <Report Physical Address> command (step S21). When having received a <Report Physical Address> command (YES in step S21), the CPU 16 acquires physical address information included in the <Report Physical Address> command and registers the logical address and physical address in the address list (step S22).

If having determined in step S18 that CEC device information is not unregistered (NO in step S18), if having determined in step S19 that there is no <ACK> command response (NO in step S19), if having determined in step S21 that there is no <Give Physical Address> command response (YES in step S21), or if having registered the acquired information in the address list (step S22), the CPU 16 increments the value of i by 1 (step S23). Then, the CPU 16 determines whether or not the value of the new i representing a logical address number is greater than 14 (step S24). The reason why it is determined whether or not the value of i is greater than 14 is that logical address 1 indicates the TV set 1 and the logical numbers to which CEC devices are allocated range from 1 to 14.

Next, when having determined that the value is not greater than 14 (NO in step S24), the CPU 16 carries out the processes in step S18 onward sequentially, determines whether or not there is an <ACK> command response from logical address i to which the <Polling Message> command has been transmitted, acquires information including a physical address from the CEC device that made a response, and registers the information in the address list.

In addition, when having determined that the value is greater than 14 (YES in step S24), the CPU 16 carries out the processes in step S12 onward sequentially when the next time has been reached, thereby transmitting a <Polling Message> command to the logical address for which no CEC device has been registered in the address list and continuing the monitoring. The time may be, for example, 10 seconds or 30 seconds but is not limited to these time lengths.

When a regular inquiry is made using a <Polling Message>, not a <Give Physical Address> command, this eliminates wasteful response waiting time and retransmission, which reduces the communication load more and makes inquires more efficiently than in a conventional method. When a CEC device does not transmit a <Report physical Address> command automatically even if an HDMI cable is inserted into the TV set, this monitoring method makes it possible to check the connection of a new CEC device.

Moreover, "0" in the logical addresses 180 can be used for not only the TV set 1 but also a display unit, such as a PC display or monitor which has an HDMI-CEC function.

Second Embodiment

Figure 8:
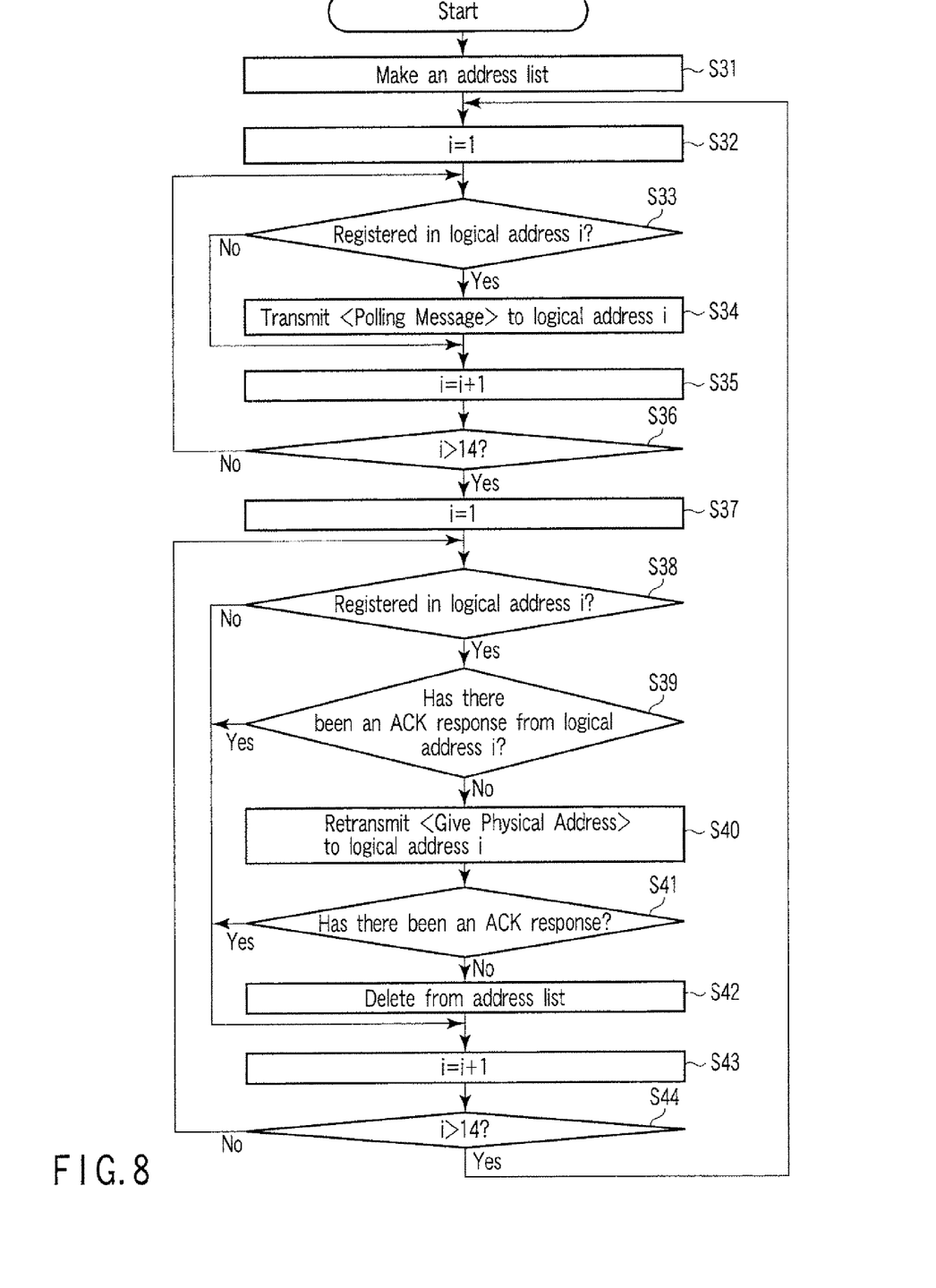
FIG. 8 is a flowchart to help explain the operation of a TV set according to a second embodiment of the invention.

FIG. 8 is a flowchart to help explain the operation of a TV set according to a second embodiment of the invention. In the explanation below, the parts which have the same configuration and functions as those of the first embodiment are indicated by the same reference numerals.

As in the first embodiment, first, the power supply of the TV set is turned on, thereby enabling communication using CEC control lines. Moreover, the TV set has already acquired address 0. Suppose, in this state, connected devices with address 1 to address 14 have been searched for and an address list has been already made (step S31).

In the processes in steps S32 to S36, the CPU 16 transmits a <Polling Message> command to the logical address in which the physical address of a CEC device has been registered.

For example, when the management table of FIG. 6 has been already formed, since logical addresses 1, 3, 4, 5 are registered addresses, the CPU transmits a <Polling Message> command to these logical addresses. Hereinafter, the processes in steps S32 to S36 will be explained.

The CPU 16 substitutes 1 into i (step S32). Here, i is a number representing the number of a logical address. Referring to the address list, the CPU 16 determines whether or not a CEC device has been registered in logical address i (step S33). If having determined that a CEC device has been registered (YES in step S33), the CPU 16 transmits a <Polling Message> command to logical address i (step S34).

If it has been determined in step S33 that a CEC device has not been registered (NO in step S33), or after the process in step S34, the CPU 16 increments the value of i by 1 (step S35). The CPU determines whether or not the value of i is greater than 14 (step S36). If having determined that the value is not greater than 14 (No in step S36), the CPU 16 carries out the processes in step S33 onward sequentially since there is a possibility that the address list still has a logical address in which a CEC device has not been registered. If having determined that the value is greater than 14 (YES in step S36), the CPU 16 carries out the processes in step S37 onward since the address list has no logical address in which a CEC device has been registered.

In the processes in step S37 onward, the CPU 16 determines whether or not there is an <ACK> command response from the logical address to which the <Polling Message> command has been transmitted and deletes from the address list the information registered in the logical address that made no response. Hereinafter, the processes in step S37 onward will be explained.

First, the CPU 16 substitutes 1 into i (step S37). Here, i is a number representing the number of a logical address. Referring to the address list, the CPU 16 determines whether or not CEC device information (including a physical address) has been registered in logical address i (step S38). If having determined that the information has been registered (YES in step 538), the CPU 16 determines whether or not there has been an <ACK> command response from logical address i (step S39).

If having determined that there has been no response (NO in step S39), the CPU 16 transmits a <Polling Message> command again (step S40) to check whether the logical address is in a state where it cannot make a response and determines whether there is an <ACK> command response (step S41). This operation may be performed once or more.

If having determined that there has been no <ACK> command response to the retransmission (NO in step S41), the CPU 16 deletes the registered CEC device information from the address list (step S42) because having determined that the CEC device has been disconnected or brought into a state where it cannot cooperate with the CPU. If having determined that there has been an <ACK> command response to the retransmitted <Polling Message> command (YES in step S41), the CPU does not delete the registered CEC device information from the address list because having determined that the CEC device is in a state where it can cooperate with the CPU.

If having determined in step S38 that CEC device information has not been registered in logical address i (NO in step S38), if having determined in step S39 that there has been an <ACK> command response from logical address i (YES in step S39), if having determined in step S41 that there has been an <ACK> command response to the retransmission (YES in step S41), or if having deleted the CEC device information caused to correspond to logical address i from the logical address (step S42), the CPU 16 increments the value of i by 1 (step S43). Then, the CPU 16 determines whether or not the value of the new i representing a logical address number is greater than 14 (step S44). The reason why it is determined whether or not the value of i is greater than 14 is that logical address 1 indicates the TV set 1 and the logical numbers to which CEC devices are allocated range from 1 to 14.

Next, when having determined that the value is not greater than 14 (NO in step S44), the CPU 16 carries out the processes in step S38 onward sequentially, determines whether or not there is an <ACK> command response from logical address i to which the <Polling Message> command has been transmitted, and deletes the CEC device information caused to correspond to logical address i that made no response.

In addition, when having determined that the value is greater than 14 (YES in step S44), the CPU 16 carries out the processes in step S32 onward sequentially when the next time has been reached, thereby transmitting a <Polling Message> command to the logical address in which a CEC device has been registered in the address list and continuing the monitoring. The time may be, for example, 10 seconds or 30 seconds but is not limited to these time lengths.

As in the second embodiment, when a regular inquiry is made using a <Polling Message>, not a <Give Physical Address> command, this eliminates wasteful communication for transmission and reception and response waiting time, which reduces the communication load more and makes inquires more efficiently than in a conventional method. This monitoring method is effective since, even if the HDMI cable is disconnected from the TV set, it is basically impossible to know the disconnection automatically using a CEC command, or the TV set cannot electrically check the connection of a CEC device connected via an AV amplifier.

Third Embodiment

Figure 9:
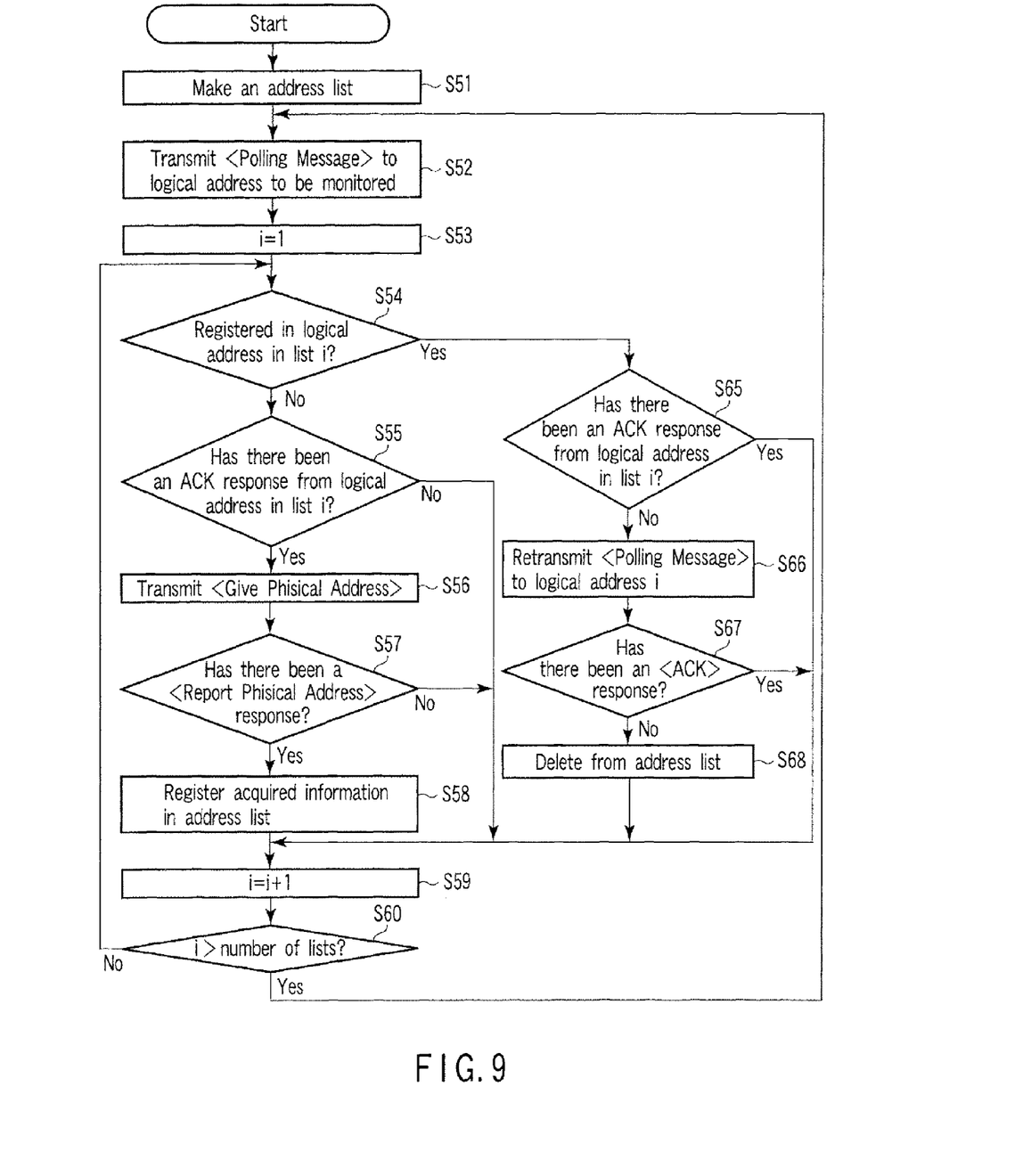
FIG. 9 is a flowchart to help explain the operation of a TV set according to a third embodiment of the invention.

FIG. 9 is a flowchart to help explain the operation of a TV set according to a third embodiment of the invention. In the explanation below, the parts which have the same configuration and functions as those of the first embodiment are indicated by the same reference numerals.

As in the first embodiment, first, the power supply of the TV unit is turned on, thereby enabling communication using CEC control lines. Moreover, the TV unit has already acquired address 0. Suppose, in this state, connected devices with address 1 to address 14 have been searched for and an address list has been already made (step S51).

The CPU 16 transmits a <Polling Message> command to a logical address to be monitored (step S52). For example, in the example of the address list shown in FIG. 6, suppose logical address 1 to logical address 5 are to be monitored. Here, the logical addresses to be monitored may be only logical address 1 or all of logical address 1 to Logical address 14 and are not limited according to the purpose. The CPU 16 makes in advance a list of addresses to which it has transmitted a <Polling Message> command. For example, in the example of the address list shown in FIG. 6, when having transmitted a <Polling Message> command to logical address 1 to logical address 5, the CPU 16 makes a transmission list shown in FIG. 10 and stores it in a RAM 17.

Figure 10:
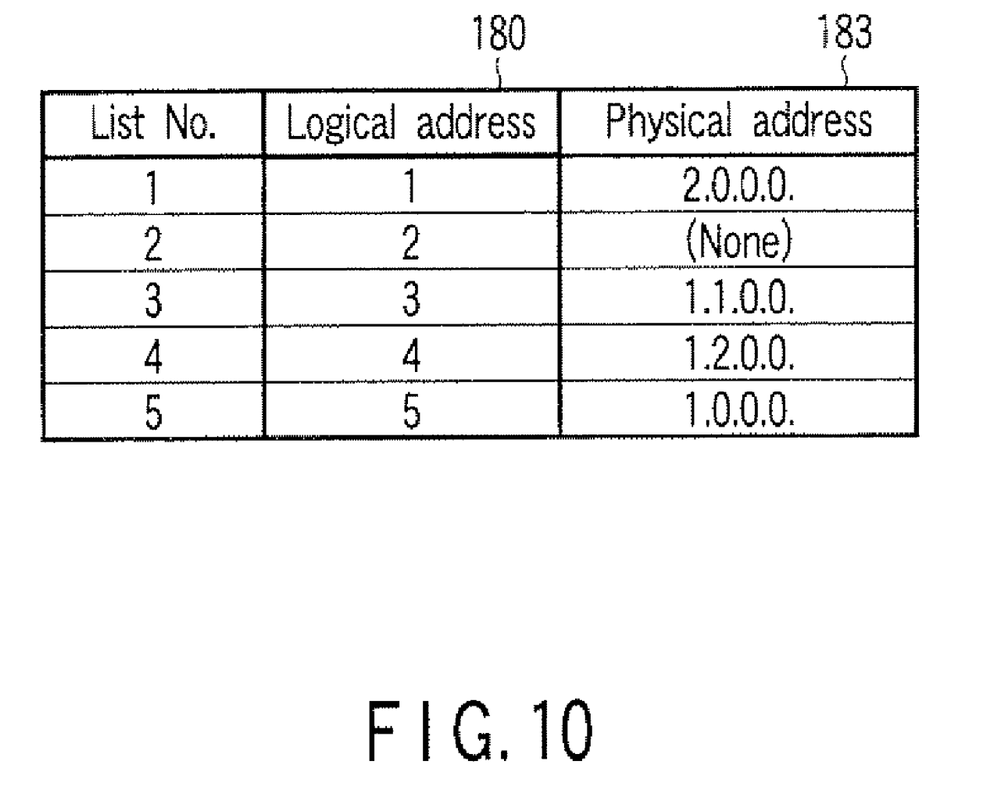
FIG. 10 is a table showing the configuration of transmission list according to the third embodiment.

In the transmission list, a logical address number to which a <Polling Message> command has been transmitted and information (here, a physical address) as to whether CEC device information has been allocated to the logical address number are allocated to a list number.

Then, the CPU 16 substitutes 1 into i (step S53). Here, i is a number representing the number of a transmission list shown in FIG. 10. Referring to the transmission list, the CPU 16 determines whether CEC device information (including a physical address) has been registered in a logical address in list i (step S54). If having determined that the information has not been registered (NO in step S54), the CPU 16 determines whether there has been an <ACK> command response from a logical address number in list i (step S55). If having determined that there has been no response (YES in step S55), the CPU 16 transmits a <Give Physical Address> command to the logical address that transmitted the <ACK> command (step S56) since there is a possibility that a CEC device has been newly connected because there has been a response from a logical address number in which no CEC device information has been registered.

If the connected CEC device is normal, the CEC device transmits physical address information and others using a <Report Physical Address> command in response to the <Give Physical Address> command. The CPU 16 determines whether or not it has received a <Report Physical Address> command (step S57). When having determined that it has received a <Report Physical Address> command (YES in step S57), the CPU 16 acquires physical address information included in the <Report Physical Address> command and registers the logical address and physical address in the address list (step S58).

If it has been determined in step S55 that Where has been no <ACK> command response from a logical address number in list i (NO in step S55), this means that there is no <ACK> command response from a logical address number in list i in which no CEC device has been registered and therefore a new CEC device has not been connected.

If it has been determined in step S54 that CEC device information has been registered in a logical address number in list i (YES in step S54), the CPU 16 determines whether or not there has been an <ACK> command response from a logical address number in list (step S65).

If having determined that there has been no <ACK> command from a logical address number in list i (NO in step S65), the CPU 16 transmits a <Polling Message> command again (step S66) to check whether the logical address number cannot make a response by way of precaution because there has been no response from the logical address number in which CEC device information has been registered, thereby determining whether there is an <ACK> command response (step S67). This operation may be performed once or more.

If having determined that there has been no <ACK> command response to the retransmission (NO in step 67), the CPU 16 deletes the registered CEC device information from the address list (step S68) because having determined that the CEC device has been disconnected or brought into a state where it cannot cooperate with the CPU. If having determined that there has been an <ACK> command response to the retransmitted <Polling Message> command (YES in step S67), the CPU does not delete the registered CEC device information from the address list because having determined that the CEC device is in a state where it can cooperate with the CPU.

If it has been determined that there has been an <ACK> command response from a logical address number in list i (step S65), this means that there has been an <ACK> command response from the logical address number in list i in which a CEC device has been registered and therefore the CEC device has not been disconnected.

If having determined in step S55 that there has been no <ACK> command response (NO in step S55, if having determined that there has been no <Report Physical Address> command response (NO in step S57), if having determined in step S65 that there has been an <ACK> command response (YES in step S65), if having determined in step S67 that there has been an <ACK> command response, or if the process in either step S58 or step S68 has been carried out, the CPU 16 increments the value of i by 1 (step S59).

Then, the CPU 16 determines whether or not the value of the new i representing a logical address number is greater than the number of lists (step S60). In the case of the list shown in FIG. 10, it is determined whether the value of i is greater than 5.

Next, when having determined that the value is not greater than the number of lists (NO in step S60), the CPU 16 carries out the processes in step S54 onward sequentially, determines whether or not there is an <ACK> command response from logical address 1 to which the <Polling Message> command has been transmitted, registers information on a newly connected CEC device in the address list, and deletes the information on the disconnected CEC device from the address list.

In addition, when having determined that the value is greater than the number of lists (YES in step S60), the CPU 16 carries out the processes in step S52 onward sequentially when the next time has been reached, thereby transmitting a <Polling Message> command to a logical address to be monitored. As in the third embodiment, a periodic inquiry is made by a combination of the method of the first embodiment and that of the second embodiment, making it possible to monitor a new connection and disconnection of a CEC device efficiently at the same time, which eliminates wasteful communication for transmission and reception, response waiting time, and retransmission and therefore reduces the communication load and enables efficient monitoring.

Furthermore, in the second embodiment, even when a connected registered CEC device cannot make an <ACK> command response temporarily, is deleted from the address list, and cannot cooperate with the CPU, if the CEC device returns to a state where it can make an <ACK> command response, the CPU detects the return in no time and registers the device in the address list again, making it possible to restart cooperation with the CEC device.

Figure 11:
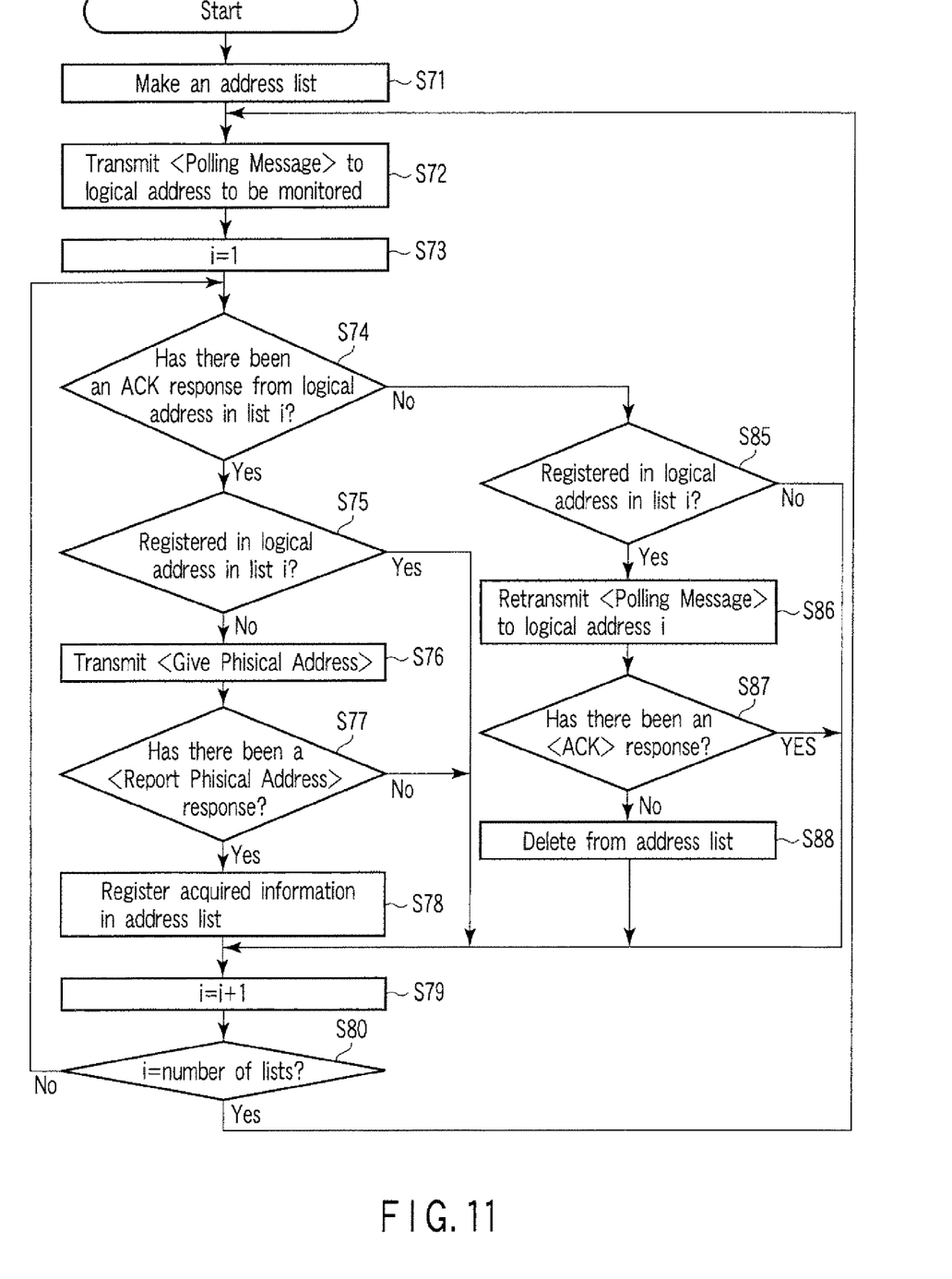
FIG. 11 is a flowchart to help explain the operation of the TV set according to the third embodiment.

Moreover, since the third embodiment is a combination of the first and second embodiments, the change of the order or the procedure shown in a flowchart shown in FIG. 11 are the same and are illustrative and not restrictive.

The processes in the flowchart of FIG. 11 will be explained below.

Suppose an address list has been made (step S71). The CPU 16 transmits a <Polling Message> command to a logical address to be monitored (step S72). For example, in the example of the address list shown in FIG. 6, suppose logical address 1 to logical address 5 are to be monitored. Here, the logical addresses to be monitored may be only logical address 1 or all of logical address 1 to logical address 14 and are not limited according to the purpose. The CPU makes in advance a list of addresses to which it has transmitted a <Polling Message> command. For example, in the example of the address list shown in FIG. 6, when having transmitted a <Polling Message> to logical address 1 to logical address 5, the CPU 16 makes a transmission list shown in FIG. 10 and stores it in the RAM 17. In the transmission list, a logical address number to which a <Polling Message> command has been transmitted and information (here, a physical address) as to whether CEC device information has been allocated to the logical address number are allocated to a list number.

Then, the CPU 16 substitutes 1 into i (step S73). Here, i is a number representing the number of a transmission list shown in FIG. 10. Referring to the transmission list, the CPU determines whether there has been an <ACK> command response from a logical address in list i (step S74). If having determined that there has been an <ACK> command (YES in step S74), the CPU 16 determines whether CEC device information (including a physical address) has been registered in the logical address in list i (step S75). If having determined that the information has not been registered (NO in step S75), the CPU 16 transmits a <Give Physical Address> command to the logical address that transmitted the <ACK> command (step S76) since there is a possibility that a CEC device has been newly connected because there has been a response from a logical address number in which no CEC device information has been registered.

If the connected CEC device is normal, the CEC device transmits physical address information and others using a <Report Physical Address> command in response to the <Give Physical Address> command. The CPU determines whether or not it has received a <Report Physical Address> command (step S77). When having determined that it has received a <Report Physical Address> command (YES in step S77), the CPU acquires physical address information included in the <Report Physical Address> command and registers the logical address and physical address in the address list (step S78).

If it has been determined in step S75 that CEC device information has been registered in a logical address number in list i (YES in step S75), this means that there is no <ACK> command response from the logical address number in list i in which no CEC device has been registered and therefore a CEC device has not been newly connected.

If it has been determined in step S74 that there has been no <ACK> command response (NO in step S74), the CPU determines whether or not CEC device information (including a physical address) has been registered in a logical address number in list i (step S85). If having determined that the information has been registered (YES in step S85), the CPU transmits a <Polling Message> command again (step S86) to check whether the logical address number cannot make a response by way of precaution because there has been no response from the logical address number in which CEC device information has been registered, thereby determining whether there is an <ACK> command response (step S87). This operation may be performed once or more.

If having determined that there has been no <ACK> command response to the retransmission (NO in step 87), the CPU deletes the registered CEC device information from the address list (step S88) because having determined that the CEC device has been disconnected or brought into a state where it cannot cooperate with the CPU. If having determined that there has been an <ACK> command response to the retransmitted <Polling Message> command (YES in step S87), the CPU does not delete the registered CEC device information from the address list because having determined that the CEC device is in a state where it can cooperate with the CPU.

If it has been determined in step S85 that no CEC device information has been registered in a logical address number in list i (No in step S85), this means that there has been no <ACK> command response from the logical address number in which no CEC device has been registered and therefore a CEC device has not been newly connected.

If having determined in step S75 that CEC device information has been registered (YES in step S75), if having determined that there has been no <Report Physical Address> command response (NO in step S77), if having determined in step S85 that no CEC device information has been registered (YES in step S85), if having determined in step S87 that there has been an <ACK> command response, or if the process in either step S78 or step S88 has been carried out, the CPU increments the value of i by 1 (step S79). Then, the CPU determines whether or not the value of the new representing a logical address number is greater than the number of lists (step S80). In the case of the list shown in FIG. 10, it is determined whether the value of i is greater than 5.

Next, when having determined that the value is not greater than the number of lists (NO in step S80), the CPU carries out the processes in step S74 onward sequentially, determines whether or not there is an <ACK> command response from logical address i to which the <Polling Message> command has been transmitted, registers information on a newly connected CEC device in the address list, and deletes the information on the disconnected CEC device from the address list.

In addition, when having determined that the value is greater than the number of lists (YES in step S80), the CPU carries out the processes in step S72 onward sequentially when the next time has been reached, thereby transmitting a <Polling Message> command to a logical address to be monitored.

With the TV set of each of the above embodiments, it is possible to monitor a new connection and disconnection of a CEC device efficiently, which eliminates wasteful communication for transmission and reception, response waiting time, and retransmission and therefore reduces the communication load and enables efficient monitoring.

Furthermore, even when a connected registered CEC device cannot make an <ACK> response temporarily, is deleted from the address list, and cannot cooperate with the CPU, if the CEC device returns to a state where it can make an <ACK> response, the CPU detects the return in no time and registers the device in the address list, making it possible to restart cooperation with the CEC device.

Moreover, since a <Polling Message> command used for connection has a low communication load, the period of the regular monitoring can be shortened. In addition, since the load on the CPU 16 is low, it is possible to provide accurate information faster about the part interfacing with the user, such as a connected device list or cooperative operation using the address list.

Since the TV set basically has to grasp the connection status of all the connected devices, the explanation has been given using the TV set in each of the above embodiments. What has been explained in the above embodiments may be applied to all of the devices provided with the HDMI-CEC function and is not limited to the TV set. Therefore, not only the TV set 1 but also a display device, such as a PC display or monitor having the HDMI-CEC function, may be used.

Furthermore, the video signal, audio signal, and CEC commands may be transmitted by wireless, not over cable.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device which communicates with at least one external device having a logical address selected from a plurality of logical addresses and a physical address, the electronic device comprising:
   a storage unit configured to store an address list in which a physical address of at least one external device communicating with the electronic device is registered so as to correspond to at least one logical address of said plurality of logical addresses; and
   a control module configured to transmit a command to check the connection of an external device to at least a first logical address of said plurality of logical addresses, to determine whether a physical address corresponding to the first logical address to which the command to check the connection of the external device has been transmitted, to transmit to the first logical address a command to obtain the physical address corresponding to the first logical address and allocated to the external device when the control module determines that there has been a response to the command to check the connection from the first logical address to which the physical address has not been registered in the address list, and to register the physical address included in a response to a command to obtain the physical address so as to correspond to the first logical address to which the command to check the connection has been transmitted in the address list stored in the storage unit.

2. The electronic device according to claim 1, wherein a video signal is transmitted from the external device to the electronic device and the electronic device further comprises a display unit for displaying an image according the video signal.

3. The electronic device according to claim 1, wherein the communication between the external device and the electronic device is performed on the basis of the HDMI standard.

4. The electronic device according to claim 1, wherein the control module is configured to delete, from the address list, information including the physical address of the external device caused to correspond to the logical address to which the command to check the connection has been transmitted when the control module determines that there has been no response to the command to check the connection from the logical address to which the physical address has been caused to correspond in the address list.

5. A connected device searching method in an electronic device which is adapted to communicate with a plurality of external devices each having a logical address and a physical address, the connected device searching method comprising:
   transmitting a command to check a connection of an external device of the plurality of external devices to at least a logical address of a plurality of logical addresses;
   producing a transmission list where information indicating whether a physical address corresponding to each of the plurality of logical addresses to which the command to check the connection of the external device has been transmitted;
   transmitting to the logical address a command to obtain a physical address allocated to the external device to which the logical address has been allocated, when it is determined based on the transmission list that there has been a response to the command to check the connection from the logical address; and
   registering the physical address included in a response to the command to obtain the physical address so as to correspond to the logical address to which the command to check the connection has been transmitted in an address list stored in an storage unit.

6. The method according to claim 5, wherein further comprising:
   deleting information including the physical address of the external device caused to correspond to the logical address to which the command has been transmitted from the address list, when there has been no response to the command to check the connection from the logical address to which the physical address has been caused to correspond in the address list.

* * * * *